Feb. 13, 1962 G. W. ESSER 3,021,394
RECORD-REPRODUCE SYSTEM
Filed June 30, 1958
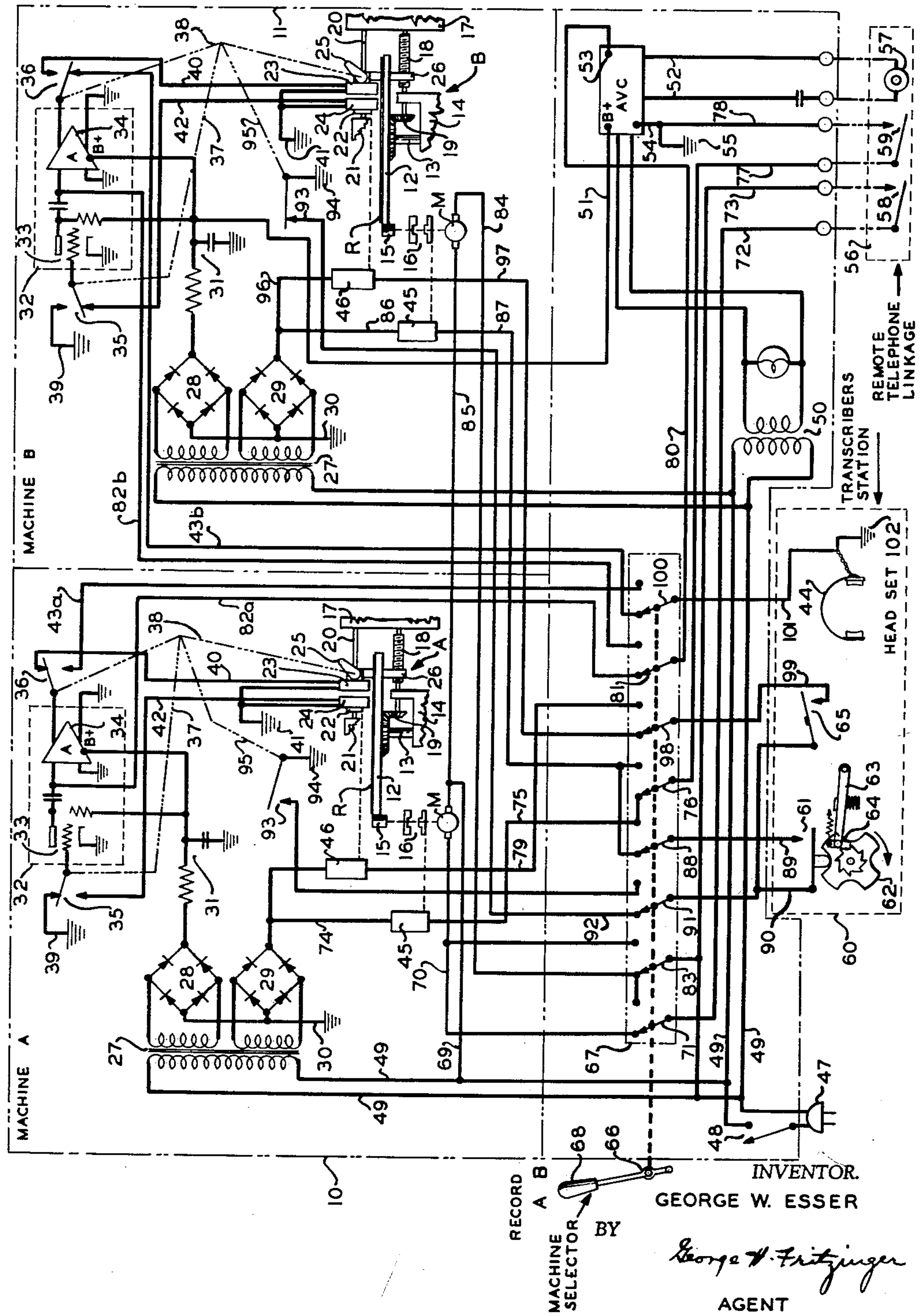
INVENTOR.
GEORGE W. ESSER
BY George H. Fritzinger
AGENT 3,021,394
Patented Feb. 13, 1962

3,021,394

RECORD-REPRODUCE SYSTEM

George W. Esser, West Orange, N.J., assignor to McGraw-Edison Company, Elgin, Ill., a corporation of Delaware Filed June 30, 1958, Ser. No. 745,389
5 Claims. (Cl. 179—100.1)

This invention relates to a dual dictation-machine system in which each machine is operable as a recorder or reproducer, but in which one machine is always maintained in condition for recording when the other is conditioned for reproducing, and vice versa, so that messages already recorded can be reproduced while further incoming messages are being recorded.

Systems of the type abovementioned are especially adapted for telegram-teletype recording. Particular advantages of this type of system reside in the continuous availability of the system to record incoming messages and in the fact that messages which have been recorded on one machine can be reproduced and transcribed from that same machine without having to remove the record from the machine.

Each of the dictating machines herein employed is of the usual type provided with a record-reproduce control which is shiftable to interchange the audio circuit connections of the amplifier with respect to the record-cooperable translating devices and to condition the latter mechanically, if necessary, to perform their respective record and reproduce functions.

The present system includes, in addition, a common selector control shiftable to interchange the connections of the machines with respect to a local transcribing station and a remote dictator's station.

Since a transcriber's start-stop control is typically of the kind which alternately is shifted between start and stop positions responsive to successive operations of a control member, the present invention provides a safety feature requiring the machine selected for transcribing by the common selector control to be itself conditioned for reproducing before the machine can be put into operation. This prevents any possible accidental operation of a machine as a recorder with possible obliteration of recorded areas on the record were such machine when in record condition connected to a transcriber's station.

Other features of the invention reside in the use of a single AVC unit for both machines, and in differently controlling the drive motors of the two machines from the dictator's and transcriber's stations, as determined by the setting of the common selector control. Other features of the invention reside in the combinations of elements hereinafter particularly described, and will be apparent from the following description.

In the description of the invention reference is had to the accompanying schematic diagram illustrating the invention.

The present system comprises two dictating machines fractionally shown in the respective dash-dot enclosures 10 and 11, wherein they are referred to as machines A and B respectively. Each machine includes a record support in the form, for example, of a turntable 12 for carrying a disc record R. Each turntable has a central shaft 13 journaled in a frame 14 and driven by a friction wheel 15 coupled through a clutch 16 to a motor M. Journaled at its end portions in the frame member 14 and a frame member 17 is a feed screw 18 coupled at its inner end by gears 19 to the shaft 13 of the turntable. Above the turntable is a crossrod 20 supported at its ends by the frame member 17 and a frame member 21, on which there is slidably mounted a carriage 22 for a recorder 23 and a reproducer 24. The recorder and reproducer are selectively engageable with the record R as by a control lever 25 on the carriage and hereinafter referred to as the RR control lever. Extending from the carriage is an arm carrying a feed nut 26 which engages the feed screw to propel the carriage slowly across the turntable as the turntable is rotated.

Each machine includes also a power transformer 27 having two secondary windings feeding into respective full-wave rectifiers 28 and 29. One output terminal of each rectifier is grounded at 30. The rectifier 28 feeds through a filter 31 to an amplifier 32 comprising a first stage 33 schematically shown and remaining amplifier stages indicated by a block 34. The record-reproduce control apparatus for each machine includes a single-pole double-throw switch 35 connected in the amplifier input circuit and a single-pole double-throw switch 36 connected in the amplifier output circuit. These switches are coupled mechanically to the RR control lever 25, as represented by the dash-dot lines 37 and 38, to effect the following results: when the RR control lever 25 is in record position as shown with respect to machine A in the drawing, the input stage of the amplifier is connected to ground at 39 and the output of the amplifier is connected through lead 40 and the recorder 23 to ground at 41; and when the RR control lever 25 is in reproduce position as shown with respect to machine B in the drawing, the reproducer 24 is connected from ground 41 through lead 42 to the input stage of the amplifier and the output of the amplifier is connected to a lead 43 with suffix letter *a* or *b*, depending upon which machine is referred to, which lead runs to a transcriber's receiver 44 as is hereinafter fully described.

The second rectifier 29 feeds into a solenoid 45, diagrammatically shown, for operating the clutch 16, and feeds also into a solenoid 46, diagrammatically shown, for back-spacing the carriage 22 as may be desired during transcribing.

Electric power for the machines is provided through a plug 47 an dan on-off master switch 48 in a power line 49 to the primary windings of the transformers 27. Heater current is also supplied to the amplifiers by means not herein necessary to show. However, there is shown the means for supplying heater current from the power line 49 through a step-down transformer 50 to an automatic volume control (AVC) unit. This is a standard AVC unit for compressing the input signal volume range before the signals are fed to the main amplifiers. The AVC unit has, for example, a B+ terminal connected by a lead wire 51 to the rectified B supply of filter 28 as of machine B, has an input circuit 52 and has a pair of output terminals 53 and 54 one of which is grounded at 55 and the other of which is connected through circuitry hereinafter described to the input of the amplifier 34 of whichever machine is conditioned for recording.

The present system is connected to a remote dictator's station 56 only partially diagrammatically indicated. Suffice to say that this station includes a microphone 57 for connection to the input 52 of the AVC unit, a switch 58 for controlling the drive motor M of which ever machine is connected to the dictator's station and a switch 59 for controlling the clutch solenoid of that machine. Through suitable switching and linkages not herein necessary to show a remote dictator as at a telephone subscriber's station may make connection of his microphone to the AVC unit and at the same time of the switches 58 and 59 to the motor and clutch circuits of the recording machine by dialing a suitable number of his telephone equipment. When such connection has been made he will receive a so-called "seize" tone apprising him that he is connected to a recording machine then already in operating condition so that he may begin dictating his message at once.

A transcriber's station generally indicated at 60, is provided at the locality of the machines A and B. This station comprises a transcriber's start-stop switch 61 typically operable as by a cam wheel 62 itself capable of being stepped ahead by successive intervals by recurrently pressing a foot or hand lever 63 coupled to the cam wheel through a pole and ratchet 64, the operation being such that by successively depressing the lever 63 the switch 61 is shifted alternately between closed and open positions. Also, the transcriber's station comprises a push switch 65 for backspacing the carriage step by step and a receiver 44 typically in the form of a pair of headphones, for reproducing the messages which have been recorded.

A feature of the invention is in providing a common shiftable selector control 66 to be operated in conjunction with the individual record-reproduce controls 25 as above-mentioned for placing the system selectively in condition for recording on either machine from a remote dictator's station and transcribing at the same time for the other machine. The selector control 66 is in the form of a multiple-pole double-throw switch 67 operable as by a lever 68 between positions which may be designated "Record" as between machines A and B. For instance, when this selector control is in position "A" the motor M of machine A is connected from one side of the power line 49 through lead 69, and is connected to the other side of the power line through lead 70, switch pole 71 at its left contact, lead 72, switch 58 of the dictator's station 56 and lead 73. This means that the motor M of machine A will be started when a dictator has dialed to make connection of his station with the machine. The clutch solenoid 45 is now connected from its D.C. power source through leads 74 and 75, pole 76 at its left contact, lead 77, switch 59 of the dictator's station, and lead 78 to ground. This means that the clutch will likewise become engaged when the remote dictator dials to make a connection with the machine; however, the backspace solenoid of machine A is now disabled because it is connected through lead wire 79 to an open terminal of the selector switch. Further, when the selector control 66 is in position A, the audio circuit from the AVC unit is connected through lead wire 80, pole 81 at its left contact and lead 82*a* to the input of the main amplifier unit 34 of the machine A, and the output of this amplifier is connected to the recorder 23. Thus, machine A—which is itself in record condition—is ready for recording any message from the remote dictator's station as soon as a connection is made thereto.

The condition of machine B when its RR control lever is in reproduce position and the selector control 66 is in the A position is as follows: the motor M of this machine is connected from one side of the power line 49 through pole 83 at its left contact and lead 84, and is connected to the other side of the power line through lead 85 and lead 69. The motor M of this machine is therefore now running. At the same time the clutch 45 of machine B is connected from its power supply through leads 86 and 87, pole 88 at its left contact, lead 89, transcriber's start-stop switch 61, lead 90, switch pole 91 at its left contact, lead 92, safety switch 93 of machine B and ground at 94. A feature of the invention is that the safety switch 93—which is provided in each machine—is tied mechanically to the respective RR control lever 25 as indicated by the dash-dot lines 95, to enable the clutch circuit of either machine to be closed from the transcriber's station only when the machine to which the transcriber's station is connected is itself in reproducing condition. This feature is very important because of the transcriber's start-stop switch 61 being not of the usual push-to-make and release-to-break type, as before described, with the result that it could very possibly be in closed position when the machine selector control 66 is shifted. Were the record-reproduce control 25 of a machine in record position when the selector control 66 is shifted to connect that machine to the transcriber's station, the machine could accidentally be started while in record condition and cause possible obliteration of the recorded matter on the record. This is prevented, however, by the safety switches above described.

Further, as to machine B while the selector control 66 is in its A position, the backspace solenoid 46 of machine B is connected from its D.C. power source through leads 96 and 97, pole 98 at its left contact, lead 99, switch 65 of the transcriber's station, and to ground through pole 91 and the safety switch 93, the same as for the transcriber's start-stop switch 61 above described. Thus, the backspace solenoid of machine B, like the start-stop solenoid, cannot be operated unless the RR control lever 25 of this machine is also in reproduce position.

Still further, when the machine selector 66 is in A position and the RR control lever 25 of machine B is in reproduce position, the output of the amplifier 34 is connected through the switch 36 at its lower contact, lead 43*b*, pole 100 at its left contact, lead 101 and receiver 44 of the transcriber's station to ground at 102. Thus, signals now picked up by the reproducer 24 of machine B will be amplified by the amplifier 32 and fed to the transcriber's receiver 44. At the same time, the machine B is under full control of the transcriber both as to start-stop operation and backspacing, to enable the recorded message on the record of machine B to be reproduced and transcribed.

If the machine selector 66 is shifted to position B without shifting the RR control levers 25 of the machines, the motor of machine A is started but the clutch solenoid 45 is not operable because of the safety switch 93 of machine A being still open. Thus, machine A cannot be operated. The motor of machine B will now be connected through switch 58 of the dictator's station, and the clutch 46 of machine B will be connected through the dictator switch 59 to enable the motor and clutch of machine B to be operated. The dictator, however, cannot record on machine B because the output of the amplifier 32 of that machine is now connected to an open terminal associated with the pole 100. Both the remote dictator and the local transcriber are apprised of this inoperable condition by suitable warning means not herein necessary to show.

When the record-reproduce controls 25 are also shifted in correspondence with the B positioning of the selector control 66—i.e., the machine A is conditioned for reproducing and the machine B for recording—the condition of the system will have become interchanged with respect to the two machines from that hereinbefore described—i.e., the machine B will be ready for recording incoming messages from the remote dictator station, and the machine A will be ready for transcribing the messages which have already been recorded by it. As soon as the local operator has transcribed the full record of machine A, she will replace this record with a new record so that machine A will be ready to be shifted back to record condition as soon as the record of machine B is fully recorded upon. When this shifting occurs, she will transcribe the recording on the record of machine B while machine A is recording further incoming messages, the advantage always being that a record placed into a machine is both recorded upon and then reproduced from before that record is removed from the machine.

The particular embodiment of the invention herein shown and described is intended to be illustrative and not limitative of the invention, since the same is subject to changes and modifications without departure from the scope of the invention, which I endeavor to express according to the following claims.

I claim:

1. In a dictating and transcribing machine comprising means for supporting a record for revolving movement, a record-cooperable record-reproduce means, and drive means for revolving said record supporting means and concurrently imparting traveling movement between said recording supporting means and said record-reproduce means: the combination of means for selectively conditioning said machine either for use as a dictating instrument or for use as a transcribing instrument; a dictator's start-stop control; a transcriber's start-stop control; means for selectively connecting said dictator's and transcriber's start-stop controls to said machine; and means controlled jointly by said conditioning means and said connecting means for rendering said drive means inoperable by said transcriber's start-stop control when said transcriber's start-stop control is connected to said machine and the machine is conditioned for recording.

2. In a dictating and transcribing machine comprising means for supporting a record for revolving movement, a record-cooperable record-reproduce means, and drive means for revolving said record-supporting means and concurrently imparting traveling movement between said recording supporting means and said record-reproduce means: the combination of means for selectively conditioning said machine either for use as a dictating instrument or for use as a transcribing instrument; a dictator's station including a start-stop control device for said machine; a transcriber's station including a start-stop control device for said machine, said transcriber's start-stop control device having a repeatedly actuatable control member and means for alternately shifting the device between start and stop positions as said control member is repeatedly actuated; selector means for connecting either said dictator's or said transcriber's station to said machine; and a control circuit for said drive means including switch means controlled by said conditioning means and switch means controlled by said selector means for rendering the drive means operable from said transcriber's station only when said machine is conditioned for reproducing.

3. In a dictating and transcribing machine comprising means for supporting a record for revolving movement, a record-cooperable record-reproduce means, and drive means for revolving said record supporting means and concurrently imparting traveling movement between said record supporting means and said record-reproduce means: the combination of an audio circuit including an amplifier, said record-reproduce means and a conditioning means movable into record position for connecting said record-reproduce means to the output of said amplifier with the former operating as a recorder and movable into a reproduce position for connecting said record-reproduce means to the input of said amplifier with the former operating as a reproducer; said drive means including a drive motor, an electrically operable drive clutch and an operating circuit for said clutch; a dictator's station including a microphone and a drive control means; a transcriber's station including a receiver and a clutch control means; selector means movable into a first position to connect said microphone to the input of said amplifier and to connect said drive control means to said machine, and movable into a second position to start said motor and connect said clutch control means of said transcriber's station into the operating circuit of said clutch; and means controlled by said conditioning and said selector means for connecting said transcriber's receiver to the output of said amplifier only when said conditioning means is in reproduce position and said selector means is in said second position.

4. In a recording and reproducing system: the combination of two separate dictating machines respectively including means shiftable into record and reproduce positions for conditioning the machines respectively for recording and reproducing; a dictator's station including a microphone and start-stop means; a transcriber's station including a receiver and start-stop means; a selector means shiftable into a first position to connect a first one of said dictating machines to said dictator's station and the second of said machines to said transcriber's station, and shiftable into a second position to connect said first machine to said transcriber's station and the second machine to said dictator's station; and means controlled jointly by said conditioning means and selector means for rendering operable the machine connected to said transcriber's station by said selector means only when the respective machine is conditioned for reproducing.

5. In a recording and reproducing system: the combination of two separate dictating machines respectively including means shiftable into record and reproduce positions for conditioning the machines respectively for recording and reproducing; a dictator's station including a microphone and start-stop means; a transcriber's station including a receiver and start-stop means; a selector means shiftable into a first position to connect a first one of said dictating machines to said dictator's station and the second of said machines to said transcriber's station, and shiftable into a second position to connect said first machine to said transcriber's station and the second machine to said dictator's station; an audio circuit in each of said machines including an amplifier, record-cooperable recorder and reproducer translating devices, and switch elements controlled by said conditioning and selector means for completing the audio circuit for reproducing from the respective reproducer translating device through said amplifier and said transcriber's receiver only when the respective conditioning means is in reproduce position and the selector means is set to connect the machine to said transcriber's station, and for completing the audio circuit for recording from said dictator's station microphone through said amplifier and the respective recorder translating device only when the respective conditioning means is in record position and the selector means is set to connect the machine to said dictator's station.

References Cited in the file of this patent

UNITED STATES PATENTS

| | | |
|---|---|---|
| 2,784,258 | Sharpe | Mar. 5, 1957 |
| 2,823,268 | Somers | Feb. 11, 1958 |